United States Patent
Rosner et al.

(10) Patent No.: US 7,047,328 B1
(45) Date of Patent: May 16, 2006

(54) METHOD AND APPARATUS FOR ACCESSING MEMORIES HAVING A TIME-VARIANT RESPONSE OVER A PCI BUS BY USING TWO-STAGE DMA TRANSFERS

(75) Inventors: Stephan Rosner, Dresden (DE); Jörg Winkler, Ullersdorf (DE); Ralf Flemming, Radebeul (DE); Stephen T. Novak, Boxdorf (DE)

(73) Assignee: Legerity, Inc., Austin, TX (US)

( * ) Notice: Subject to any disclaimer, the term of this patent is extended or adjusted under 35 U.S.C. 154(b) by 555 days.

(21) Appl. No.: 09/904,748

(22) Filed: Jul. 13, 2001

(51) Int. Cl.
*G06F 13/00* (2006.01)

(52) U.S. Cl. ............................. 710/25; 710/35; 710/52; 710/305

(58) Field of Classification Search ............. 710/22–28, 710/33–35, 52–57, 240, 260, 305–315, 38; 709/253; 712/38; 714/763
See application file for complete search history.

(56) References Cited

U.S. PATENT DOCUMENTS

| | | | | |
|---|---|---|---|---|
| 4,545,014 A | * | 10/1985 | Oguchi | 710/22 |
| 4,672,613 A | * | 6/1987 | Foxworthy et al. | 714/763 |
| 5,325,489 A | * | 6/1994 | Mitsuhira et al. | 710/22 |
| 5,805,842 A | * | 9/1998 | Nagaraj et al. | 710/313 |
| 6,067,595 A | * | 5/2000 | Lindenstruth | 710/307 |
| 6,253,250 B1 | * | 6/2001 | Evans et al. | 709/253 |
| 6,389,527 B1 | * | 5/2002 | Raam et al. | 712/38 |
| 6,453,368 B1 | * | 9/2002 | Yamamoto | 710/27 |

* cited by examiner

*Primary Examiner*—Christopher B. Shin
(74) *Attorney, Agent, or Firm*—Williams, Morgan & Amerson

(57) ABSTRACT

The invention relates to an apparatus and a method for accessing memories having a time-variant response over a PCI bus by using two-stage DMA transfers. The invention provides a method for executing a read request over a PCI bus by transferring the requested data from a main memory of a PCI card to a device located on the PCI bus, comprising the steps of obtaining an access request from a read access queue, transferring, by a first DMA transfer, the requested data from the main memory to a buffer memory on the PCI card, and transferring, by a second DMA transfer, the data from the buffer memory to the device.

26 Claims, 3 Drawing Sheets

METHOD AND APPARATUS FOR ACCESSING MEMORIES HAVING A TIME-VARIANT RESPONSE OVER A PCI BUS BY USING TWO-STAGE DMA TRANSFERS

BACKGROUND OF THE INVENTION

1. Field of the Invention

This invention relates generally to accessing a memory over a bus, and, more particularly, to a method and an apparatus for accessing memories having a time-variant response over a PCI bus by using two-stage DMA transfers.

2. Description of the Related Art

The demand for delivery of information in video and multimedia formats to households is steadily increasing. Presently installed communication technologies do not have enough bandwidth to provide adequate data transmission and new broadband cabling will take a significantly long time to reach all prospective subscriber households.

ADSL (Asymmetric Digital Subscriber Line) technology increases the digital capacity of ordinary telephone lines, by converting existing twisted-pair telephone lines into access paths for multimedia and high speed data communications. ADSL and its variants can share the same line as the telephone, because they use higher frequencies than the voice band used for typical telephone signaling protocols. The ADSL signals are combined and separated at both sides of the telephone line. At the customer's site, the splitting is done either with an external device, or it is built into an ADSL modem. Contrary to ASDL, ISDN transmits through a standard telephone system based on copper wires carrying analog voice data, a so-called switched telephone network.

The standard bus architecture found in most personal computers today is the PCI (Peripheral Component Interconnect) bus. A PCI bus is comprised of a set of wires that is used to electrically interconnect the various semiconductor chips and input/output devices of a computer system. Electrical signals are conducted over the bus so that the various components can communicate with each other. This type of bus architecture offers a simple, efficient, and cost-effective method of transmitting data.

For communication between a device and an ADSL card residing on a PCI bus, four types of transactions generally exist:

1. master write accesses from the device to the ADSL card, which is equivalent to a target read access from the perspective of the ADSL card;
2. master read accesses from the device to the ADSL card, which is equivalent to a target write access from the perspective of the ADSL card;
3. master write accesses from the ADSL card to the device, which is equivalent to a target read access from the perspective of the device card; and
4. master read accesses from the ADSL card to the device, which is equivalent to a target write access from the perspective of the device card.

Master accesses of the ADSL card are not critical, because master writes can be posted. This leads to minimal occupation time of the PCI bus. Generally, master read accesses are targeted at fast memory. This excludes long idle times of the PCI bus while data is fetched. However, master accesses of the device to the ADSL card are critical, if the main memory of the ADSL card is slow and time-variant.

As data transmissions increase, known PCI bus transmission procedures do not show adequate operation speed, since they are too slow for present-day applications.

To fully take advantage of the ADSL technology, it is desirable to improve the accessibility of PCI cards in an ADSL environment, especially with regard to latency over a PCI bus. In a typical computing system, the most time-consuming operation is usually associated with memory access times and availability, i.e., special memories on PCI cards that have time-variant access behavior and that are not accessible by normal DMA (Direct Memory Access) transfers.

DMA is a technique for transferring data from main memory to a device without passing it through the CPU. Although DMA may periodically steal cycles from the CPU, data is transferred much faster than when the CPU is used for all data transfers. DMA uses dead time on an external bus, to perform the data transfer operations. In this way, when the processor is not accessing an expansion card, the external bus can transfer data directly to the memory. When accessing PCI card memories having time-variant access behavior, polling over the PCI bus may be required to check whether the required data is available. Furthermore, additional overhead may be attributed to setup and maintenance of control information associated with such memory accesses. In state-of-the-art systems, software overhead associated with such memory accesses is present and a high bandwidth is required. Therefore, the performance of such systems is not optimal and improved performance is desirable.

The present invention solves, or at least reduces, some or all of the aforementioned problems.

SUMMARY OF THE INVENTION

The present invention provides a method for executing a read request over a PCI bus by transferring the requested data from a main memory of a PCI card having time-variant response time to a device located on the PCI bus, comprising the steps of obtaining an access request from a read access queue, transferring, by a first DMA transfer, the requested data from the main memory to a buffer memory on the PCI card having a time-invariant access behavior, and transferring, by a second DMA transfer, the data from the buffer memory to the device.

The present invention further provides a method for executing a write request over a PCI bus by transferring the requested data from a device located on a PCI bus to a main memory of a PCI card having time-variant response time, comprising the steps of writing an access request to a queue, transferring, by a first DMA transfer, the requested data from the device to a buffer memory on the PCI card having a time-invariant access behavior, and transferring, by a second DMA transfer, the data from the buffer memory to the main PCI card memory.

The present invention also provides an apparatus for executing a read request over a PCI bus, comprising a queue for storing read access requests, a main memory on a PCI card having time-variant access behavior, which stores the data to be transferred, a buffer memory on the PCI card having time-invariant access behavior for buffer storage of the data, whereby data transfer to the buffer memory is accomplished by a first DMA transfer, a device located on a PCI bus for receiving the data, whereby data transfer from the buffer memory to the device is accomplished by a second DMA transfer, and a finite state machine associated with the queue for selecting an access request and initiating the second DMA transfer.

The present invention also provides an apparatus for executing a write request over a PCI bus, comprising a queue for storing write access requests, a device located on a PCI bus, which stores the data to be transferred, a main memory on a PCI card having time-variant access behavior for receiving the data, a buffer memory having time-invariant access behavior for buffer storage of the data, whereby the transfer to the buffer memory is accomplished by a first DMA transfer and the transfer from the buffer memory to the main is memory is accomplished by a second DMA transfer, and a finite state machine associated with the queue for selecting an access request and initiating the second DMA transfer.

BRIEF DESCRIPTION OF THE DRAWINGS

The invention may be understood by reference to the following description taken in conjunction with the accompanying drawings, in which like reference numerals identify like elements, and in which.

Figure 1:
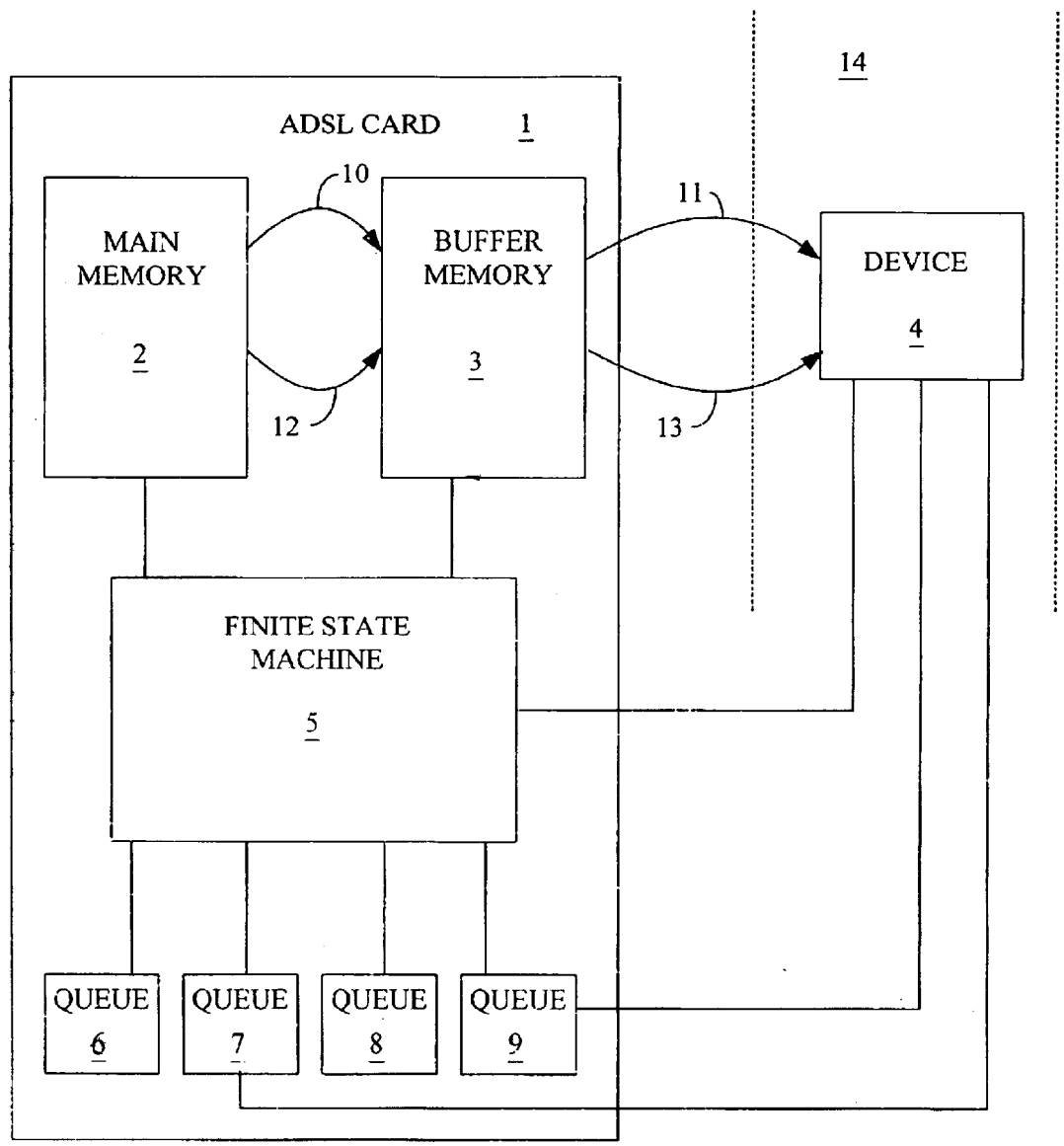
FIG. 1 is a diagram depicting the elementary structure of the data transference according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Although the various regions and structures of a semiconductor device are depicted in the drawings as having very precise, sharp configurations and profiles, those skilled in the art recognize that, in reality, these regions and structures are not as precise as indicated in the drawings. Additionally, the relative sizes of the various features and doped regions depicted in the drawings may be exaggerated or reduced as compared to the size of those features or regions on fabricated devices. Nevertheless, the attached drawings are included to describe and explain illustrative examples of the present invention.

Master write accesses from a device to an ADSL card in a computer system is the counterpart to a target read access from the perspective of the ADSL card, and master read accesses from a device to an ADSL card is the counterpart to a target write access from the perspective of the ADSL card. Master write accesses can be posted using PCI posting mechanisms and master read accesses of the device are transformed into master write accesses of the ADSL card.

If a PCI read or write request occurs, the respective request is sent to a separate access queue, depending on whether it was a read or write request. If the main memory shows time-variant access behavior and, therefore, is only indirectly accessible, normal DMA transfers are excluded. However, in order to be able to use conventional DMA transfers, an additional buffer storage having a time-invariant access behavior is located on the PCI ADSL card. A two-stage DMA transfer utilizing the buffer storage is enabled by a finite state machine. According to the present invention, the two-stage DMA transfers are realized by generally executing the following steps:

1. An access request is selected from either the read or write access queue.
2. After a request is selected, the control registers of the associated finite state machine are initialized.
3a. For read transfers, a write command is sent, which leads to a first stage DMA being initiated by the finite state machine after the read request was read from the command queue in the ADSL card. The finite state machine gathers the requested data from the main memory and subsequently sends the data to the buffer memory. The buffer memory has a time-invariant access behavior and is located on the PCI ADSL card. Therefore, the device located on the PCI bus, which is requesting the data stored in the main memory, and the main memory are decoupled. The decoupling occurs because PCI bursts first target the buffer memory. After the data is transferred from the main memory to the buffer memory, a conventional, second DMA transfer occurs, which transmits the data from the buffer memory to the device located on the PCI bus.
3b. For write transfers, the data is sent by a conventional DMA transfer from the device to the buffer memory. The buffer memory has a time-invariant access behavior and is located on the PCI ADSL card. The first DMA transfer is initiated by the device. Therefore, the device and the main memory are equally decoupled. In a second DMA transfer, the finite state machine transfers the data from the buffer memory to the main memory, whereby the time-variant behavior of the main memory is taken into account.

By means of the present invention, data transfers over a PCI bus occur in conventional DMA bursts, which result in an efficient usage of PCI bandwidth. Moreover, time-consuming access to time-variant memory is avoided. Thus, despite the unpredictable access behavior of the main memory, no polling over the PCI bus is necessary.

In order to serve a delayed transaction, the relevant information for executing it has to be stored in the target command queue (ie., address data, command data, byte enable data and for write requests additional data and the data parity).

It should be noted that typically a PCI device does not need to support more than one delayed (read) transaction. However, it should be able to store two write actions. Since the stored information differs for read and write actions, the target command queues are separated for the respective action. When a new target access is latched, the command information is stored in either a read or a write command buffer. In order to keep track of the order in which the commands have arrived, the access type (read or write) is set in an ordering ring buffer. As long as the ordering ring buffer is not empty, the access type of the next command is checked. If it is a read command, the read command buffer is multiplexed to the application. If it is a write command, the write counter is incremented. Then, the next write command is selected and multiplexed to the application. Consequently, by design of the read and write access queues and the associated control logic, competing accesses to the memory are resolved automatically and correct ordering between them is guaranteed.

Referring now to FIG. 1, one particular embodiment of the present invention is depicted. In FIG. 1, PCI ADSL card 1 comprises a main memory 2, an additional buffer memory 3, a finite state machine 5, a master read access queue 6, a target read access queue 7, a master write access queue 8 and a target write access queue 9. The finite state machine 5 is connected with the queues 6, 7, 8 and 9. In one embodiment of the present invention, main memory 2 has a time-variant access behavior and buffer memory 3 has a time-invariant access behavior. A device located on the PCI bus 14 is indicated by reference number 4. The device 4 and the main memory 2 are always decoupled. The device 4 may be any kind of computer hardware being located on the PCI bus 14, e.g., a host. The device 4 is connected with the finite state machine 5 and the target command queues 7 and 9.

If a master read request occurs from the device 4, first of all, the access request is gathered from the target read access queue 7. Subsequently, the control registers (not shown) of the finite state machine 5 associated with the queue are initialized. Then, the requested data is transferred from the main memory 2 to the buffer memory 3 by a first DMA burst taking the time-variant behavior of the main memory 2 into account. This action is indicated by arrow 10. After the execution of this first transfer 10, a second conventional DMA burst transfers the requested data from the buffer memory 3 to the device 4, which receives the requested data. This action, which is initiated by the finite state machine 5, is indicated by arrow 11. An important aspect of the present invention is that data polling is avoided, since master read cycles of the device 4 are transformed to master write cycles of the PCI ADSL card 1. This principle is realized by programming the actual read request of the device 4 by means of a master write access of the device 4 into the PCI command queue 7. This queue is polled locally, i.e., not over the PCI bus 14. Therefore, the read request from the device 4 will be detected and interpreted by the finite state machine 5 of the ADSL card 1. This causes the PCI ADSL card 1 to initiate a master write access to the device 4, whereby the requested data is written to the device 4. Thus, a master read request of the device 4 is hidden as a master write access of the PCI ADSL card 1.

Write requests are executed in a similar procedure. For master write accesses of the device 4 to the PCI ADSL card 1, the data is written by a first DMA burst 13, which is indicated by arrow 13, to the time-invariant memory 3 of the card 1. This first DMA transfer 13 is initiated by the device 4. The write command is written into the command buffer of the device 4. This first DMA transfer is initiated by the device 4. After that, a second DMA transfer 12 is initiated and the access request is selected by the finite state machine 5. Thereby, the data stored in the small time-invariant memory 3 is transferred to the time-variant main memory 2 of the card 1. For the second DMA transfer 12, the time-variant access behavior of the main memory 2 is taken into consideration.

As explained above, the present invention provides a new function, increases operation speed, improves efficiency, and simplifies software design. Hence, the traffic on a PCI bus imposed by state of the art polling, controlling, and data transfers to clients having an unpredictable response time is decreased.

Figure 2:
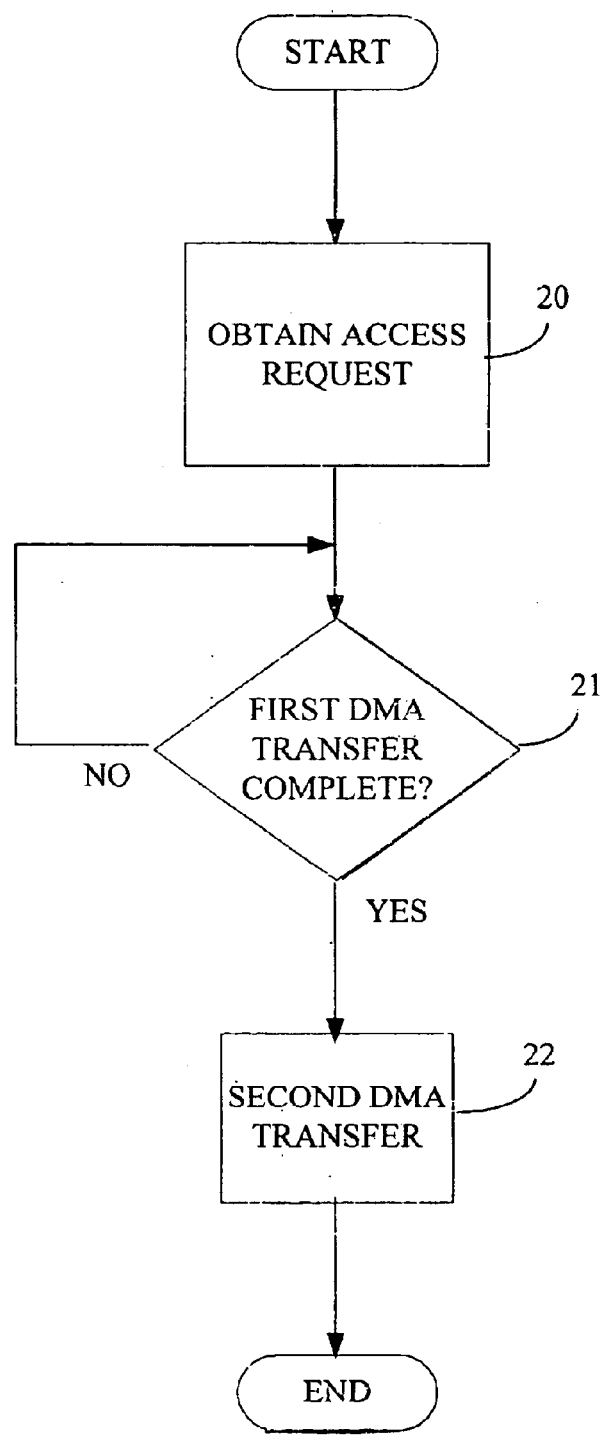
FIG. 2 is a flow diagram showing the execution of a read request according to the present invention.

Referring now to FIG. 2, a flow diagram showing the execution of a read request is depicted. For transferring data over a PCI bus from a main memory of a PCI card having time-variant response time to a device located on the PCI bus, an access request from a queue has to be obtained, which is indicated by step 20 in FIG. 2. Subsequently, in step 21, the requested data is transferred by a first DMA transfer from the main memory to a buffer memory on the PCI card. The buffer memory has a time-invariant access behavior. Once the data transfer to the buffer memory is terminated, or complete, a second DMA transfer is initiated in step 22. This second DMA transfer delivers the data from the buffer memory to the device.

Figure 3:
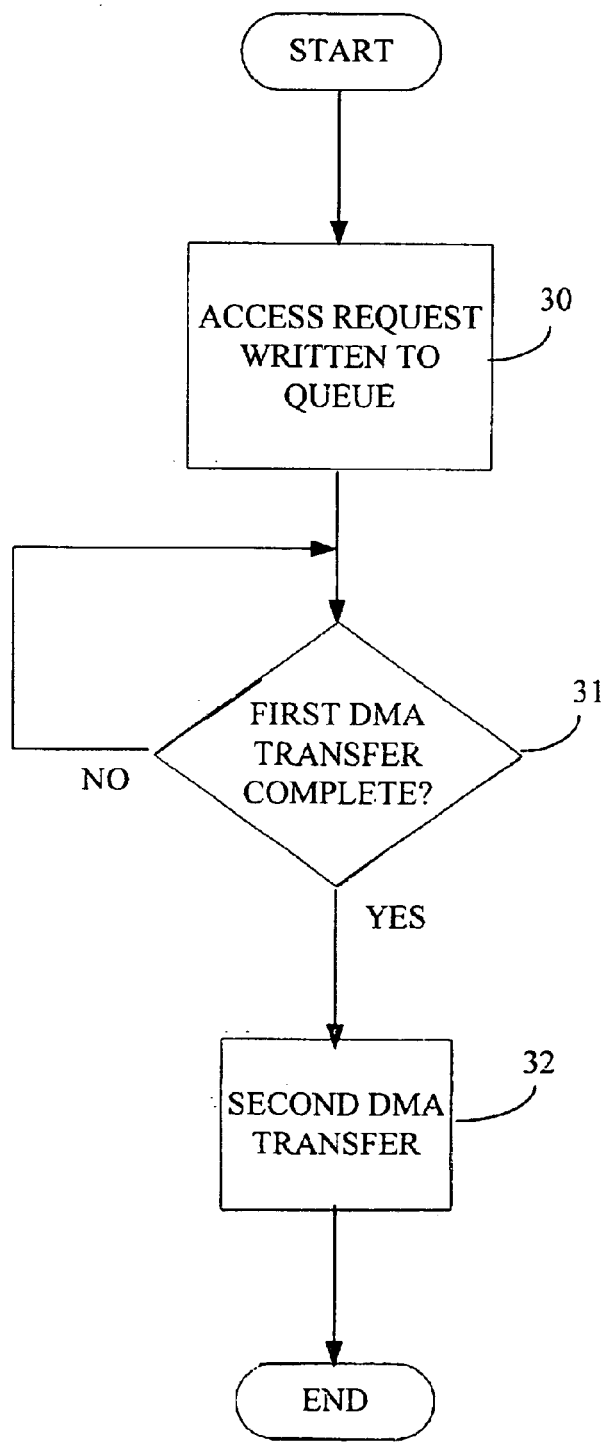
FIG. 3 is a flow diagram showing the execution of a write request according to the present invention.

Referring now to FIG. 3, a flow diagram showing the execution of a write request is depicted. For transferring requested data from a device located on a PCI bus to a main memory of a PCI card having time-variant response time, first, an access request has to be written to a queue, which is indicated by step 30 in FIG. 3. Subsequently, in step 31, the data is transferred by a first DMA transfer from the device to a buffer memory on the PCI card. The buffer memory has a time-invariant access behavior. Once the data transfer to the buffer memory is terminated, or complete, a second DMA transfer is initiated in step 32. This second DMA transfer delivers the data from the buffer memory to the main PCI card memory.

The finite state machine 5 of FIG. 1 may be implemented using any known technology. A person of ordinary skill in the relevant art will be well-equipped to implement the state machine 5, given the benefit of this disclosure. The buffer memory 3 of FIG. 1 may also be implemented using any of a variety of well-known components. For example, the buffer memory 3 may take the form of a FIFO buffer or may be implemented using an addressable random access memory device. Other implementations of the buffer memory 3 of FIG. 1 will become obvious to the person of ordinary skill having the benefit of this disclosure.

The particular embodiments disclosed above are illustrative only, as the invention may be modified and practiced in different but equivalent manners apparent to those skilled IQ; in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention.

Accordingly, the protection sought herein is as set forth in the claims below.

What is claimed:

1. A method for executing a mad request over a PCI bus by transferring data from a time-variant main memory of a first device to a second device, comprising the steps of:

obtaining an access request from a queue;

transferring, by a first DMA transfer, data from said time-variant main memory to a time-invariant second memory on said first device; and transferring, by a second DMA transfer, said data from said time-invariant second memory to said second device.

2. The method of claim 1, wherein said second DMA transfer is initiated and said access request is selected by a finite state machine which is associated with said queue.

3. The method of claim 1, wherein said second DMA transfer is initiated after said data transfer to said time-invariant second memory is terminated.

4. The method of claim 1, wherein said read request is a master read request hidden as a master write access of said first device.

5. The method of claim 4, wherein said master read request is directed to a target command queue of a finite state machine.

6. The method of claim 1, wherein said second device and said time-variant main memory are decoupled.

7. The method of claim 1, wherein data polling is avoided by transforming master read cycles of said second device to master write cycles of said first device.

8. A method for executing a write request over a PCI bus by transferring requested data from it second device to a time-variant main memory of a fast device, comprising the steps of:

writing an access request to a queue;

transferring, by a first DMA transfer, data from said second device to a time-invariant second memory on said first device; and transferring, by a second DMA transfer, said data from said time-invariant second memory to said time-variant main memory of said first device.

9. The method of claim 8, wherein said time-variant access behavior of said time-variant main memory is taken into consideration for said second DMA transfer.

10. The method of claim 8, wherein said first DMA transfer is initiated by said second device.

11. The method of claim 8, wherein said second DMA transfer is initiated and said access request is selected by a finite state machine, which is associated with said queue.

12. The method of claim 8, wherein said second DMA transfer is initiated after said data transfer to said time-invariant second memory is terminated.

13. The method of claim 8, wherein said second device and said time-variant main memory are decoupled.

14. An apparatus for executing a read request over a PCI bus, comprising:

a queue for storing a read access request;

a time-variant main memory for storing data to be transferred;

a time-invariant buffer memory for buffer storage of said data, whereby data transfer to said time-variant buffer memory is accomplished by a first DMA transfer, a device located on the PCI bus for receiving said data, whereby data transfer from said time-variant buffer memory to said device is accomplished by a second DMA transfer; and a finite state machine associated with said queue for selecting an access request.

15. The apparatus of claim 14, wherein said time-variant main memory and said time-invariant buffer memory are located on a PCI card.

16. The apparatus of claim 15, wherein data polling is avoided by transforming master read cycles of said device to master write cycles of said PCI card.

17. The apparatus of claim 14, wherein said finite state machine is adapted to initiate said second DMA transfer.

18. The apparatus of claim 14, wherein said second DMA transfer is initiated after said data transfer to said time-invariant buffer memory is terminated.

19. The apparatus of claim 14, wherein said device and said time-variant main memory are decoupled.

20. An apparatus for executing a write request over a PCI bus, comprising:

a queue for storing a write access request;

a device located on a PCI bus for storing data to be transferred;

a time-variant main memory for receiving said data;

a time-invariant buffer memory for buffer storage of said data, whereby data warder to said time-invariant buffer memory is accomplished by a first DMA transfer and data transfer from said time-invariant buffer memory to said time-variant main memory is accomplished by a second DMA transfer; and a finite state machine associated with said queue for selecting an access request.

21. The apparatus of claim 20, wherein said invariant access behavior of said main memory is taken into consideration for said second DMA transfer.

22. The apparatus of claim 20, wherein said time-variant main memory and said time-invariant buffer memory are located on a PCI card.

23. The apparatus of claim 20, wherein said first DMA transfer is initiated by said device.

24. The apparatus of claim 20, wherein said finite state machine is adapted to initiate said second DMA transfer.

25. The apparatus of claim 20, wherein said second DMA transfer is initiated after said data transfer to said time-invariant buffer memory is terminated.

26. The apparatus of claim 20, wherein said device and said time-variant main memory are decoupled.

* * * * *

UNITED STATES PATENT AND TRADEMARK OFFICE
CERTIFICATE OF CORRECTION

| | | |
|---|---|---|
| PATENT NO. | : 7,047,328 B1 | Page 1 of 1 |
| APPLICATION NO. | : 09/904748 | |
| DATED | : May 16, 2007 | |
| INVENTOR(S) | : Rosner et al. | |

It is certified that error appears in the above-identified patent and that said Letters Patent is hereby corrected as shown below:

Col. 6, line 55 claim 1, replace "mad" with --read--.

Col. 7, line 16, claim 8, replace "it" with --a--.

Col. 7, line 17, claim 8, replace "a" with --first--.

Signed and Sealed this

Twenty-second Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 7,047,328 B1
APPLICATION NO. : 09/904748
DATED : May 16, 2006
INVENTOR(S) : Rosner et al.

It is certified that error appears in the above-identified patent and that said Letters Patent is hereby corrected as shown below:

Col. 6, line 55 claim 1, replace "mad" with --read--.

Col. 7, line 16, claim 8, replace "it" with --a--.

Col. 7, line 17, claim 8, replace "a" with --first--.

This certificate supersedes Certificate of Correction issued May 22, 2007.

Signed and Sealed this

Twelfth Day of June, 2007

JON W. DUDAS
*Director of the United States Patent and Trademark Office*